United States Patent [19]
Schmidtke

[11] Patent Number: 5,512,903
[45] Date of Patent: Apr. 30, 1996

[54] INTEGRITY LIMIT APPARATUS AND METHOD

[75] Inventor: Keith B. Schmidtke, Plymouth, Minn.

[73] Assignee: Honeywell Inc., Minneapolis, Minn.

[21] Appl. No.: 247,787

[22] Filed: May 23, 1994

[51] Int. Cl.$^6$ .......................... H04B 7/185; G01C 21/80
[52] U.S. Cl. ............................ 312/357; 364/454
[58] Field of Search .............. 342/357; 364/454

[56] References Cited

U.S. PATENT DOCUMENTS

| | | | |
|---|---|---|---|
| 4,894,655 | 1/1990 | Joguet et al. | 342/357 |
| 5,311,195 | 5/1994 | Mathis et al. | 342/357 |
| 5,373,298 | 12/1994 | Karouby | 342/357 |
| 5,394,333 | 2/1995 | Kao | 364/450 |

OTHER PUBLICATIONS

"Integrated Laser Inertial/GPS Navigation" Author: Randolph Hartman Royal Institute of Navigation NAV '89 Satellite Navigation Conference, Oct. 1989.

Honeywell Brochure "Advanced GNS/IRS" Issued: Aug. 1992.

*Primary Examiner*—Gregory C. Issing
*Attorney, Agent, or Firm*—Charles J. Ungemach

[57] ABSTRACT

An apparatus and method for determining the hybrid integrity limit of a system which receives inputs from a Global Positioning System Receiver indicative of measurement information, autonomous position information and autonomous integrity limit information and receives inputs from an independent source means indicative of motion by determining the hybrid position from the measurement information and the motion inputs and then adding the difference between the autonomous position and the hybrid position to the autonomous integrity limit.

7 Claims, 1 Drawing Sheet

INTEGRITY LIMIT APPARATUS AND METHOD

BACKGROUND OF THE INVENTION

1. Field of the Invention

The present invention relates to a method and apparatus for determining the integrity limit for a device that is connected to a Global Positioning System (GPS) receiver (sometimes referred to as the "Autonomous" receiver) and integrates the information received from the GPS receiver with another independent motion or position determining sensor [for example, the gyroscopes and accelerometers in an Inertial Reference Unit (IRU), or an Attitude and Heading Reference Unit (AHRU) etc.] to determine a "hybrid" position.

2. Description of the Prior Art

Global Positioning System (GPS) is a satellite navigation system known in the art. Within airborne equipment that determines a GPS navigation position, there exists an integrity monitoring subsystem which determines the integrity limit signal associated with the calculated GPS position. The integrity limit is defined more specifically as the distance from the calculated GPS position which contains the actual position with the following constraints: 1) a 99.9% probability that the actual position is within the integrity limit, 2) does not include flight technical errors, and 3) includes all equipment failures within the entire system.

A device called a GPS receiver is used to receive signals emitted from the navigation satellites. With the information received from the satellites, the GPS receiver calculates its position along with time, velocity, and status information. This data is called the GPS "autonomous" or navigation data. Also within the GPS receiver, there exists an integrity monitoring subsystem which determines the integrity limit signals associated with the autonomous position. The GPS receiver also transmits measurement information about each satellite that it is tracking. This information includes pseudo range from the satellite, satellite position, time, range data, and health status of the satellite.

The GPS receiver determines the position and velocity of the aircraft, but it does not compute aircraft attitude. An Inertial Reference Unit (IRU) employing gyroscopes and accelerometers determines aircraft attitude and motion information. The IRU can also provide velocity and position information based off the motion detected by the gyroscopes and accelerometers, but over a period of time they tend to drift and provide less than highly accurate indications. Honeywell Inc. produces a Global Positioning Inertial Reference Unit (GPIRU) identified as an HG1050AG01 which is referred to as a "hybrid" system because it provides outputs which are a combination of the GPS and IRU information. More particularly, the GPIRU includes an inertial reference subsystem with gyros and accelerometers to provide information about aircraft attitude and rate of change of position from which an inertial position can be determined. The GPIRU receives the autonomous data, autonomous integrity limits and satellite measurement information from the GPS receiver. It uses the satellite measurement information as a second and independent source for determining aircraft position and velocity. The inertial reference data is integrated with the GPS satellite measurement information in the GPIRU to produce a set of hybrid navigation signals. Like the GPS receiver, the GP1RU must also compute an integrity limit signal associated with the computed hybrid position. In the prior art, an integrity monitor subsystem is included in the GPIRU to perform this task.

The integrity monitoring subsystem is a costly, complex, time and space consuming apparatus. By eliminating the integrity monitoring subsystem in either the GPS receiver or the GPIRU reduces the cost and complexity associated with developing the applicable product. This invention eliminates the need of having an integrity monitoring subsystem within the GPIRU by calculating the hybrid integrity limit based on the autonomous integrity limit, the autonomous position and the hybrid position.

It should be understood that while the GPIRU is used as an example of a device that calculates a hybrid position by integrating the GPS receiver's data with the inertial reference data, other devices are also capable of producing a hybrid position. The present invention is applicable to not only the GPIRU, but, as stated above, to any device that meets the criteria of being connected to the GPS receiver and integrating the information received therefrom with another independent source of attitude or position information.

SUMMARY OF THE INVENTION

The present invention allows the hybrid integrity limit signals to be calculated based on the GPS receiver integrity limit signals and position along with the hybrid position. Therefore, the hybrid integrity monitoring subsystem is not necessary. This is accomplished by comparing the GPS receiver position to the hybrid position at a corresponding point in time, and obtaining a value that represents the distance between the two positions. It is important that the GPS receiver position and the hybrid position represent a single point in time when the position difference is determined. This allows any change in position caused by aircraft movement to be eliminated from the calculation, thus creating an absolute position difference free of any position displacement caused by time skew. The instant in time that the GPS receiver position is valid is determined very accurately from a time mark signal and UTC time which is sent by the GPS receiver to the hybrid computing device (i.e. GPIRU). The position difference value between the GPS receiver and hybrid positions is added to the GPS receiver integrity limit signal to represent the hybrid integrity limit signal. The hybrid integrity limit signal computed by this method includes, at minimum, the entire area covered by the GPS receiver integrity limit. Therefore, as long as the actual position is within the GPS receiver integrity limit, the hybrid integrity limit is guaranteed to include the actual position. Thus, a similar result that meets the definition of integrity limit is obtained as in the HG1050AG01 but the cost, space, time and complexity of the hybrid integrity monitoring subsystem has been eliminated.

DETAILED DESCRIPTION OF THE PREFERRED EMBODIMENT

Figure 1:
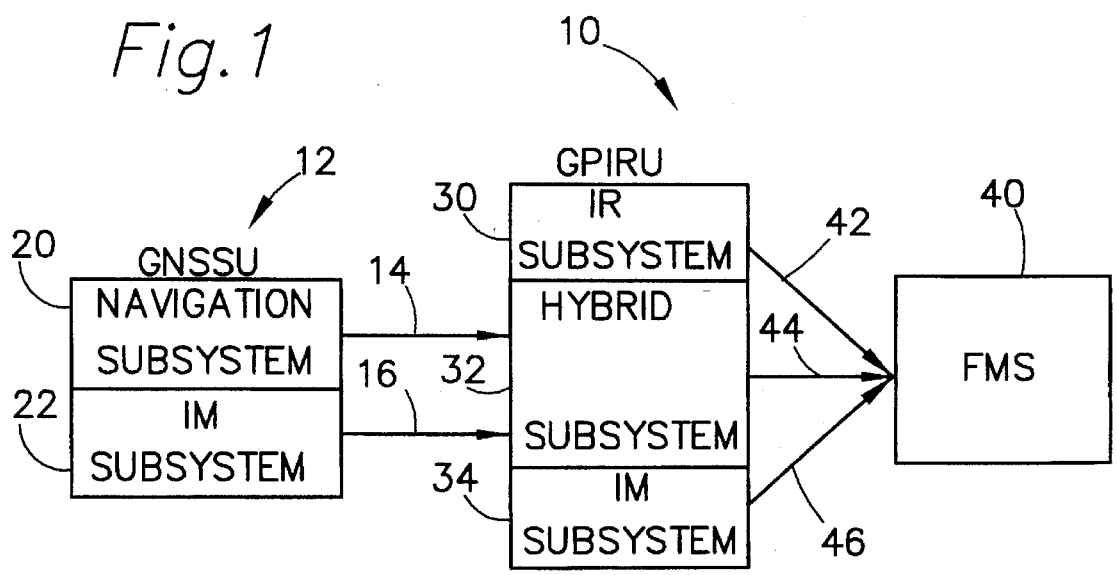
FIG. 1 is a system block diagram showing the prior art including the Honeywell HG1050AG01.

FIG. 1 shows the Honeywell HG1050AG01 Global Positioning Inertial Reference Unit (GPIRU) 10 connected to a GPS receiver which may also be called a Global Navigation Satellite Sensor Unit (GNSSU) 12 by lines 14 and 16. GNSSU 12 includes a Global Positioning System navigation subsystem 20 and an Integrity Monitoring subsystem (IM) 22 which computes the integrity limit for the autonomous i.e. the GPS receiver position. The GPIRU 10 includes an Inertial Reference subsystem 30, a Hybrid subsystem 32 which receives the autonomous data and the satellite measurement information from the GPS receiver 20 on connection 14 and the IRU information from the IR subsystem 30 and calculates the hybrid signals from these inputs. The GPIRU 10 also includes an Integrity Monitoring subsystem (IM) 34 which, similar to the GPS receivers IM 22, computes the integrity limit for the hybrid position. The GPIRU 10 supplies the inertial reference information to an aircraft control and/or display system such as a Flight Management System (FMS) 40 over a connection 42, the hybrid information over a connection 44 and the hybrid integrity limit information over the connection 46. Connection 44 also serves to transmit the autonomous information and the GPS receiver integrity limit information from the GNSSU 12 to the FMS 40.

Figure 2:
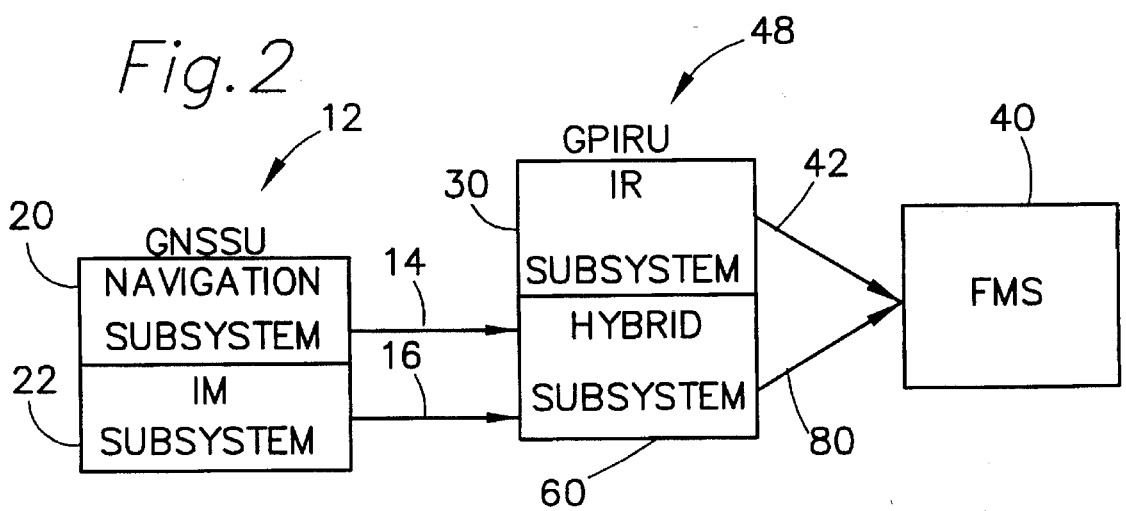
FIG. 2 is a system block diagram of an embodiment of the present invention.
Figure 3:
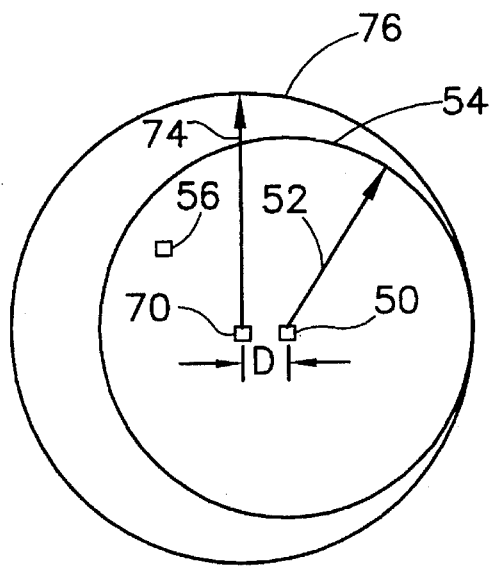
FIG. 3 is a depiction of the hybrid and autonomous positions, the integrity limits associated therewith and the actual position of an aircraft.

FIG. 2 and FIG. 3 show an embodiment of the present invention to eliminate the Hybrid Integrity Monitoring subsystem 34 of FIG. 1. In FIG. 2, the GNSSU 12 with its GPS navigation subsystem 20 and its Integrity Monitoring subsystem 22 are the same as in FIG. 1 and provide autonomous data and satellite measurement information over connection 14 and integrity limit information over connection 16 to a GPIRU 48. GPIRU 48 includes the same IR subsystem 30 as in FIG. 1 but a Hybrid subsystem 60 operates to provide an additional calculation as will be described. The autonomous position which is received from the autonomous information supplied by GNSSU 12 can be seen in FIG. 3 as a point 50 and the Autonomous Integrity Limit from the Integrity Monitoring subsystem 22 can be seen in FIG. 3 as an arrow 52 representing a radius of a circle 54. Circle 54 shows the area which will have a 99.9% chance of including the actual position which is shown in FIG. 3 as point 56. Similarly, the hybrid position calculated by the Hybrid subsystem 60 can be seen in FIG. 3 as a point 70. The distance between the autonomous position 50 and the hybrid position 70 is shown as distance D in FIG. 3. Distance D can be computed by the Hybrid subsystem 60 since it knows the autonomous position 50 and the hybrid position 70. Accordingly, the Hybrid Integrity Limit can be easily computed by Hybrid subsystem 60 by adding the distance D to the Autonomous Integrity Limit distance 52. Thus, in FIG. 3, an arrow 74 is shown representing the Hybrid Integrity Limit distance as the radius of a circle 76. Since by definition, circle 54 must have a 99.9% chance of including the actual position 56 and since circle 76 must entirely surround circle 54, point 56 will be within circle 76 if it is within circle 54. Since it has a 99.9% chance of being within circle 54, it has at least a 99.9% chance of being within circle 76. Accordingly, the hybrid integrity limit has been computed without utilizing the Hybrid Integrity Monitoring subsystem 34 of FIG. 1.

In FIG. 2, the Flight Management System 40 which is the same as in FIG. 1, receives the inertial reference information from IR subsystem 30 in GPIRU 48 and the hybrid signals, the autonomous signals, the autonomous integrity limit signal and the newly calculated hybrid integrity limit signal over a connection 80. Thus, it is seen that I have provided a unique apparatus and method for establishing the hybrid integrity limit without the use of a Hybrid Integrity Monitoring subsystem and thus save the cost, complexity and space of the previous system. Although the present invention has been described with reference to the preferred embodiments, workers skilled in the art will recognize that changes may be made to the details without departing from the spirit and scope of the invention.

The embodiments of an invention in which an exclusive property or right is claimed are defined as follows:

1. Apparatus for use with a plurality of GPS satellites for determining a hybrid integrity limit relative to a calculated hybrid position of an object comprising:

GPS receiver means proximate to the object to receive signals from the satellites and to produce a plurality of signals containing measurement information, information indicative of GPS position for the object and information indicative of GPS integrity limit relative to the GPS position;

sensing means proximate the object producing a plurality of signals containing information indicative of motion of the object;

hybrid function means connected to the sensing means and to the GPS receiver means to derive a signal indicative of hybrid position from the signals produced by the GPS receiver means and sensing means, deriving a value indicative of the difference between the hybrid position and the GPS position and deriving the hybrid integrity limit by adding the value indicative of the difference between the hybrid position and the GPS position to the GPS integrity limit.

2. Apparatus according to claim 1 wherein the object is an aircraft and the plurality of signals from the GPS receiver include information relative to the GPS position of the aircraft and the plurality of signals from the sensing means include information relative to the motion of the aircraft.

3. Apparatus according to claim 2 wherein the signals from the sensing means include information relative to aircraft attitude and rate of change of aircraft position.

4. Apparatus according to claim 1 wherein signals from the GPS receiver means, signals from the sensing means and signals from the hybrid function means are presented to a flight management system on an aircraft.

5. The method of determining a hybrid integrity limit from 1) signals from GPS receiver means containing satellite measurement information, GPS position information and GPS integrity limit information and 2) signals from sensing means containing motion information comprising the steps of:

a) computing a hybrid position from the signals in 1) and 2)

b) computing the difference between the GPS position and the hybrid position; and;

c) adding the difference from step b) to the GPS integrity limit.

6. Apparatus for use in a hybrid GPS system which includes GPS receiver means to supply signals indicative of GPS position and GPS integrity limit, and includes hybrid function means to supply signals indicative of hybrid position, comprising in combination:

processor means to compute the difference between the GPS position and the hybrid position and to add the difference to the GPS integrity limit to produce a signal indicative of the hybrid integrity limit.

7. Apparatus according to claim 6 wherein the apparatus is mounted on an aircraft and the signals indicative of GPS position, GPS integrity limit, hybrid position and hybrid integrity limit are used in the operation of the aircraft.

\* \* \* \* \*